United States Patent
Thomas et al.

(10) Patent No.: US 6,632,266 B2
(45) Date of Patent: Oct. 14, 2003

(54) HIGH-PRESSURE SEPARATION OF A MULTI-COMPONENT GAS

(75) Inventors: Eugene R. Thomas, Houston, TX (US); Harry W. Deckman, Clinton, NJ (US); Donald J. Victory, Sugar Land, TX (US); Ronald R. Chance, Annandale, NJ (US); Russell H. Oelfke, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 1 day.

(21) Appl. No.: 10/234,920

(22) Filed: Sep. 4, 2002

(65) Prior Publication Data

US 2003/0131726 A1 Jul. 17, 2003

Related U.S. Application Data

(60) Provisional application No. 60/318,087, filed on Sep. 7, 2001.

(51) Int. Cl.[7] .............................................. B01D 53/22
(52) U.S. Cl. .................... 95/49; 95/50; 95/51
(58) Field of Search .................... 95/39, 45, 49–51; 96/4, 6–10; 166/265, 266, 268, 275

(56) References Cited

U.S. PATENT DOCUMENTS

| 2,729,291 A | | 1/1956 | Haverfield ............... 166/7 |
| 3,534,528 A | * | 10/1970 | Porter ..................... 95/49 |
| 4,130,403 A | | 12/1978 | Cooley et al. ............ 55/16 |
| 4,264,338 A | * | 4/1981 | Null ........................ 95/47 |
| 4,435,191 A | | 3/1984 | Graham ..................... 55/16 |
| 4,466,946 A | | 8/1984 | Goddin, Jr. et al. ....... 423/228 |
| 4,518,399 A | | 5/1985 | Croskell et al. ........... 55/16 |
| 4,561,864 A | | 12/1985 | Klass et al. ............... 55/16 |
| 4,741,398 A | * | 5/1988 | Goldsberry ................ 166/266 |
| 4,746,430 A | | 5/1988 | Cooley .................... 210/321.85 |
| 4,767,426 A | | 8/1988 | Daly et al. ................ 55/487 |
| 4,781,907 A | * | 11/1988 | McNeill .................... 423/351 |

(List continued on next page.)

FOREIGN PATENT DOCUMENTS

| EP | 0 945 163 A1 | 9/1999 |
| WO | WO 98/53031 | 11/1998 |

OTHER PUBLICATIONS

Nieck Edwin Benes, Dissertation entitled "Mass Transport in Thin Supported Silica Membranes", Dec. 21, 2000.

Meyer, H.S. and Gamez, J.P., "Gas Separation Membranes: Coming of Age for Carbon Dioxide Removal from Natural Gas", The 45th Annual Laurance Reid Gas Conditioning Conference, Norman, Oklahoma, pp. 284–306, 1995.

Schell, W.J., Houston, C.D., and Hopper, W.L., "Separation of $CO_2$ from Mixtures by Membrane Permeation", Gas Conditioning Conference, pp. 1–22, 1983.

Chakma, A., "Acid Gas Removal Using Immobilized Liquid Membranes", The 42nd Annual Laurance Reid Gas Conditioning Conference, Norman, Oklahoma, pp. 36–60, 1992.

*Primary Examiner*—Robert H. Spitzer

(57) ABSTRACT

The invention relates to a method of separating one or more components from a multi-component gas stream comprising at least one non-acid gas component and at least one acid gas component. A multi-component gas stream at a pressure above 1,200 psia (82.8 bar) and a temperature above 120° F. (48.9° C.) with the concentration of at least one acid gas component in the gas stream being at least 20 mole percent is passed to a membrane system that selectively separates at least one acid gas component from the multi-component gas stream as a permeate stream. The permeate stream has a pressure at least 20% of the pressure of the feed pressure.

20 Claims, 2 Drawing Sheets

U.S. PATENT DOCUMENTS

| | | | | |
|---|---|---|---|---|
| 4,842,718 A | * | 6/1989 | Luteijn et al. | 208/308 |
| 5,053,058 A | | 10/1991 | Mitariten | 55/16 |
| 5,096,468 A | | 3/1992 | Minhas | 55/16 |
| 5,407,467 A | | 4/1995 | Lokhandwala et al. | 95/49 |
| 5,411,721 A | | 5/1995 | Doshi et al. | 423/220 |
| 6,053,965 A | | 4/2000 | Lokhandwala | 95/49 |
| 6,128,919 A | | 10/2000 | Daus et al. | 62/624 |
| 6,221,131 B1 | * | 4/2001 | Behling et al. | 95/50 |
| 6,299,669 B1 | | 10/2001 | Koros et al. | 95/51 |
| 6,454,836 B1 | | 9/2002 | Koelmel et al. | 95/46 |
| 6,502,635 B1 | | 1/2003 | Underdown et al. | 166/267 |
| 2002/0104435 A1 | * | 8/2002 | Baker et al. | 95/45 |
| 2002/0124722 A1 | * | 9/2002 | Baker et al. | 95/45 |
| 2002/0189445 A1 | * | 12/2002 | Miller et al. | 95/51 |

\* cited by examiner

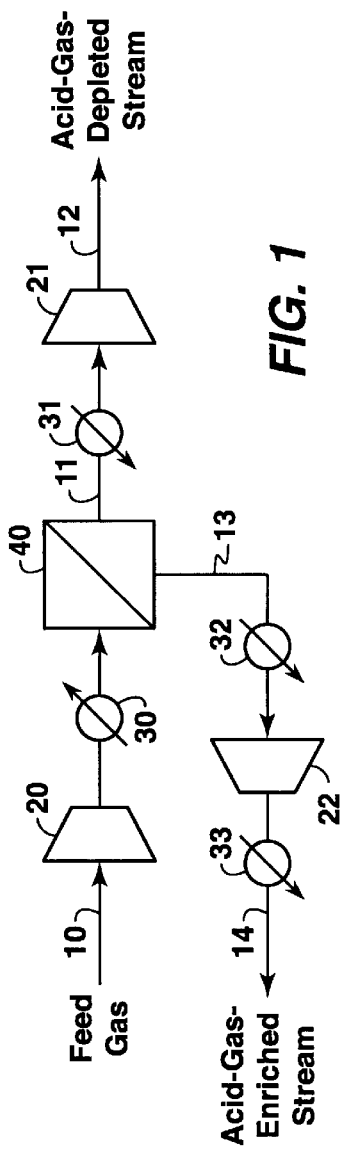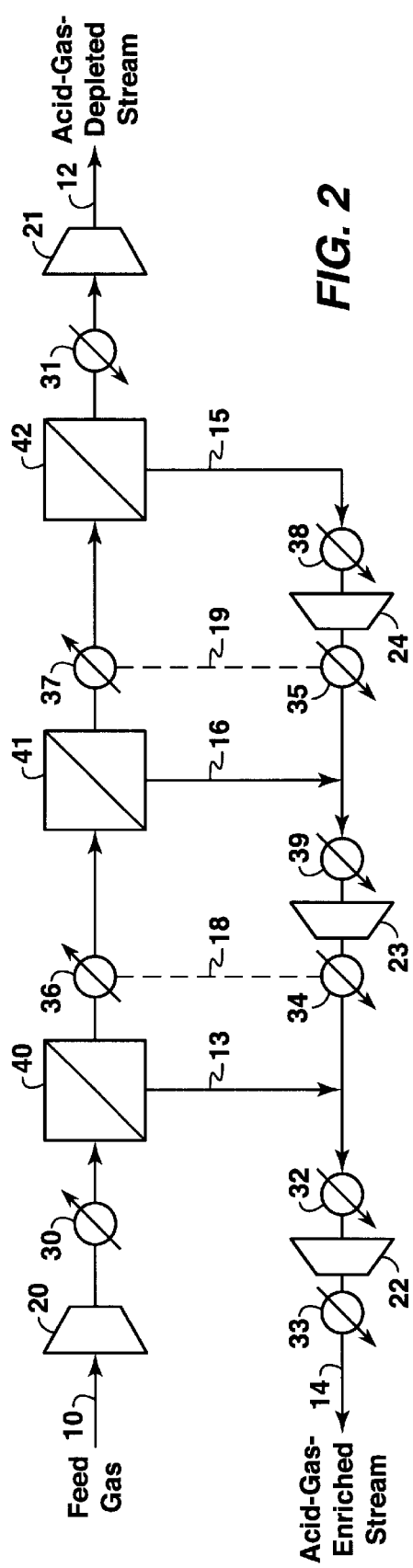

HIGH-PRESSURE SEPARATION OF A MULTI-COMPONENT GAS

CROSS REFERENCE TO RELATED APPLICATION

This application claims the benefit of U.S. Provisional Patent Application No. 60/318,087 filed Sep. 7, 2001. The application is related to co-pending provisional patent application Nos. 60/318,080 and 60/318,085, both filed on Sep. 7, 2001.

FIELD OF THE INVENTION

The invention relates to a process for separation of gases, and more specifically relates to separating one or more components from a multi-component gas stream using a semi-permeable membrane.

BACKGROUND

Many gas steams contain large amounts of acid gases, such as carbon dioxide, tat must be separated from the wore valuable components in the gas. One such gas stream is natural gas from well production, which is used extensively as fuel and as a basic raw material in the petrochemical and other chemical process industries. While the composition of natural gas can vary widely from field to field, many natural gas reservoirs contain relatively low percentages of hydrocarbons (less than 40%, for example) and high percentages of acid gases, principally carbon dioxides, but also hydrogen sulfide, carbonyl sulfide, carbon disulfide, and various mercaptans. Removal of the acid gases from well production is desirable to provide conditioned or sweet dry natural gas either for delivery to a pipeline, natural gas liquids recovery, helium recovery, conversion to liquid natural gas, or nitrogen rejection. The separated acid gases are available for processing, sequestration, or disposal. The acid gases have for example been reinjected into a subterranean formation for disposal and into s-hydrocarbon-bearing formations for hydrocarbon recovery.

A number of processes for the recovery or removal of carbon dioxide from gas streams have been proposed and practiced on a commercial scale. In practice, these processes occur at feed pressures below 1,200 psia (82.8 bar). The processes vary widely, but generally involve some form of solvent absorption, adsorption on a porous adsorbent, distillation, or diffusion through a semipermeable membrane.

Membranes are thin barriers that allow preferential passage of certain components of a multi-component gas mixture. Most membranes can be separated into two types: porous and nonporous. Porous membranes separate gases based on molecular size and/or differential adsorption by small pores in the membrane. Gas separation membranes used in natural gas applications are often nonporous or asymmetric and separate gases based on solubility and diffusivity. These membranes typically have a microporous layer, one side of which is covered with a thin, nonporous "skin" or surface layer. The separation of the gas mixtures through an asymmetric membrane occurs in its skin, while the microporous substrate gives the membrane mechanical strength.

In a typical membrane separation process, a gas is introduced into the feed side of a module tat is separated into two compartments by the permeable membrane. The gas stream flows along the surface of the membrane and the more permeable components of the gas pass through the membrane barrier at a higher rate than those components of lower permeability. After contacting the membrane, the depleted feed gas residue stream, the retentate, is removed from contact with the membrane by a suitable outlet on the feed compartment side of the module. The gas on the other side of the membrane, the permeate, is removed from contact with the membrane through a separate outlet. The permeate stream from the membrane may be referred to as being "enriched" in the readily permeable components relative to the concentration of the readily permeable components late retentate stream. The retentate may also be referred to as being "depleted" of the readily permeable components. While the permeate stream can represent the desired product, in most natural gas permeation processes the desired product is the retentate stream, and the permeate stream comprises contaminants such as $CO_2$ or other acid gases.

While the selection of a suitable membrane typically involves many factors, two important factors are (1) the capability of the membrane to withstand the conditions to which it may be subjected during the separation operation, and (2) adequate selective separation of one or more desired gases at a sufficiently high flux (flow rate). Separation membranes that exhibit a high selectivity but low flux are unattractive as they require large separating membrane surface area. Similarly, separation membranes that exhibit adequately high flux but undesirable low selectivity are also unsuitable for practical application. Practical separation membranes are those having the capability of maintaining a desired performance of flux and selectivity over an extended period of time in adverse operating environments.

Membrane systems for removing $CO_2$ from natural gas streams are typically designed to receive the natural gas stream at elevated pressure to avoid the costs associated with compressing the gas stream to a higher pressure level. If the produced gas pressure is above about 1,200 psia (82.8 bar), the conventional practice is to reduce the feed pressure to avoid damaging the membrane. An illustrative example of a membrane separation process is disclosed in U.S. Pat. No. 5,411,721 (Doshi et al.), which uses a membrane system to provide a high-pressure retentate stream rich in methane and a lower pressure permeate stream rich in $CO_2$. Doshi et al. takes advantage of high wellhead gas pressure as the driving force for membrane separation by passing feed gas to a membrane system at pressures "from 500 psia to about 2,000 psia or higher" (34 to 138 bar). In contrast to the invention described in this patent, Doshi et al. is not concerned with performing high pressure membrane separation at elevated temperatures and it is not concerned with providing a high-pressure permeate.

An important aspect of any natural gas treating process is economics. Natural gas is typically treated in high volumes, making even slight differences in process efficiency very significant in the selection of process technology. The ability to perform acid gas separation at high pressure can increase that efficiency and have a large impact on the overall economics of the treating process. Some natural gas resources, particularly those with significant concentrations of non-hydrocarbons, are now uneconomical to produce because of processing costs. There is a continuing need for improved natural gas treating processes that have high reliability and represent simplicity of operation. It is particularly desirable to have a process that can effectively separate $CO_2$ and other acid gases from natural gas so that the acid gas stream is at as high a pressure as possible for subsequent disposal or sequestration.

SUMMARY

The invention relates to a method of separating one or more components from a multi-component gas stream comprising at least one non-acid gas component and at least one acid gas component. A multi-component gas stream at a pressure above 1,200 psia (82.8 bar) and a temperature above 120° F. (48.9° C.) with the concentration of at least one acid gas component in the gas stream being at least 20 mole percent is passed to a membrane system that selectively separates at least one acid gas component from the multi-component gas stream as a permeate stream. The permeate stream has a pressure of at least 20% of the pressure of the feed pressure.

BRIEF DESCRIPTION OF THE DRAWINGS

The invention and its advantages will be better understood by referring to the drawings in which like numerals identify like parts and in which:

FIG. 1 is a diagrammatic representation of one embodiment of the invention showing a single stage membrane separation system.

FIG. 2 is a diagrammatic representation of a second embodiment of the invention showing three membrane separation stages.

Figure 3:
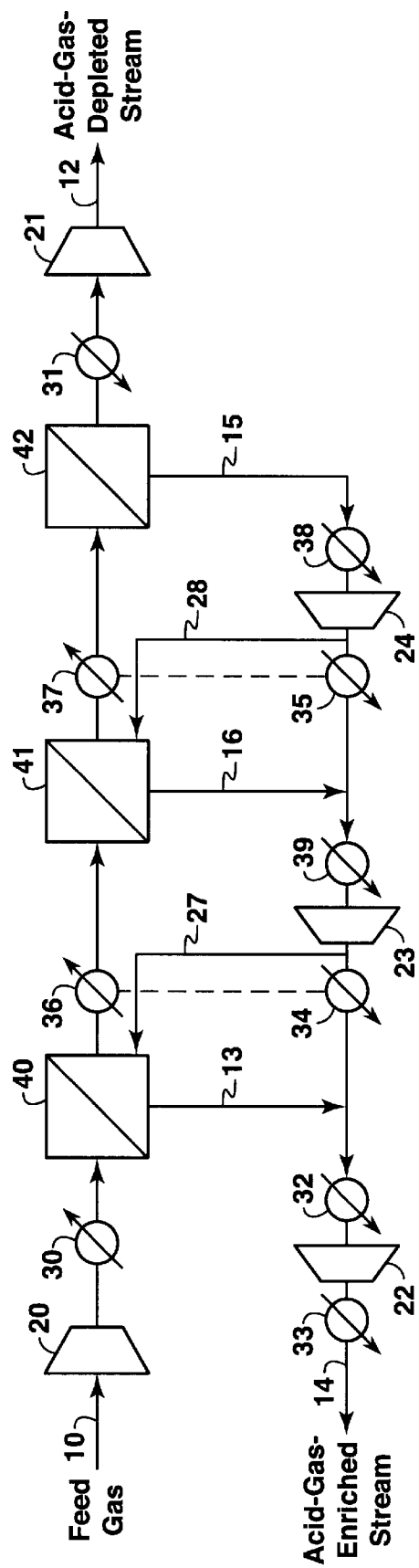
FIG. 3 is a diagrammatic representation of a third embodiment of the invention, similar to the second embodiment, showing use of compressed permeate streams to provide heating to at least one of the membrane modules used in the separation process.

The drawings illustrate specific embodiments of practicing the process of this invention. The drawings are not intended to exclude from the scope of the invention other embodiments that are the result of normal and expected modifications of these specific embodiments.

DETAILED DESCRIPTION

The method of the present invention uses a membrane separation system operating at pressures above 1,200 psia (82.8 bar) and at temperatures above 120° F. (48.9° C.) to separate one or more acid gases from a multi-component gas stream comprising acid gas and non-acid gases, such as methane and nitrogen, to provide a high-pressure retentate stream and a high-pressure permeate stream. Compared to separation systems used in the past, the invention reduces the energy required for processing the multi-component gas and it reduces the amount of compression power required to perform the separation and to produce a high pressure permeate and retentate. The invention will be described with respect to treatment of a natural gas stream containing one or more acid gases such as $CO_2$ and/or $H_2S$; however, the invention is not limited to treatment of natural gas. The inventive method can be used to separate any gas mixture containing low boiling gases (such as $C_1$ and $C_2$ hydrocarbons and $N_2$) and acid gases (such as $CO_2$, $C_2S$, and $H_2S$).

In one embodiment, natural gas containing $CO_2$ in a concentration of at least 20 mole percent, preferably at least 30 mole percent, at a temperature above 120° F. (48.9° C.) and pressure above 1,200 psia (82.8 bar) is passed to a membrane separation unit to provide a pressurized permeate stream enriched in $CO_2$, preferably at least 60 mole percent $CO_2$ and more preferably at least 80 mole percent $CO_2$ at a pressure at least 20% of the pressure of the natural gas to the membrane, and a pressurized retentate stream enriched in methane. The practice of the present invention is founded on two observations: (1) the compressibility factors for gas streams containing significant amounts of acid gases (feed gas and permeate stream) are less than the compressibility factor for the retentate steam, resulting in a less overall compression power and (2) improved flux of acid gases through a semi-permeable membrane can be obtained at feed gas pressures above 1,200 psia (82.8 bar) if the feed gas temperature is above 120° F. (48.9° C.).

In this patent, the term "natural gas" refers to a multi-component gas obtained from a crude oil well (associated gas) or from a gas well (non-associated gas). The composition and pressure of natural gas can vary significantly. A typical natural gas stream contains methane ($C_1$) as a significant component. The natural gas will also typically contain ethane ($C_2$), higher molecular weight hydrocarbons, one or more acid gases, and minor amounts of contaminants such as water, nitrogen, iron sulfide, wax, and crude oil. The term "acid gas" in this description means one or more compounds selected from the group comprising carbon dioxide, hydrogen sulfide, carbonyl sulfide, carbon disulfide, and mercaptans.

Compressibility Factor

Before proceeding further with the detailed description, basic principles of gas compressibility are provided to aid the reader in understanding the invention.

The relation between pressure, volume, and temperature of a gas can be expressed by the Ideal Gas Law, which is stated as PV=nRT, where:

P=pressure of gas

V=volume of gas n=number of moles of the gas

R=the universal gas constant (which, as is known, varies somewhat depending on volume and temperature)

T=absolute temperature of the gas

If the equation is expressed in English units, the pressure is in pounds per square inch absolute (psia), the volume is in cubic feet, and temperature is in degrees R (degrees Fahrenheit plus 459.7).

The Ideal Gas Equation does not give exactly correct results in actual practice, because gas molecules interact with one another. Gas molecules, when compressed, pack more tightly together than would be predicted by the Ideal Gas Equation, because of intermolecular forces and molecular size and shape. To correct for this, an added term, the compressibility factor, z, can be added to the Ideal Gas Equation. This is a dimensionless factor, which reflects the non-ideality of the particular gas being measured, at the particular temperature and pressure conditions.

At atmospheric pressure or gauge pressures of a few hundred pounds per square inch (psi), the compressibility factor is sufficiently close to 1.0 for most gases that it can be ignored, enabling use of the Ideal Gas Law without the added term z. However, where pressures of more than a few hundred psi exist, the z term can be different enough from 1.0 so that it must be included in order for the Ideal Gas Equation to give correct results. The z factor is important in determining the amount of compression power required in gas separation processes. Increases in the z factor increase the energy required to pump or compress for storage a given standard volume of gas.

According to the van der Waals theorem, the deviation of a natural gas from the Ideal Gas Law depends on how far the gas is from its critical temperature and critical pressure. Thus, the terms Tr and Pr (known as reduced temperature and reduced pressure respectively) have been defined, where:

$$Tr = \frac{T}{Tc}$$

$$Pr = \frac{P}{Pc}$$

Where:

T=the temperature of the gas in degrees R

Tc=the critical temperature of the gas in degrees R

P=the pressure of the gas in psia

Pc=the critical pressure of the gas in psia

Critical pressures and critical temperatures for pure gases have been calculated, and are available in handbooks. Where a mixture of gases of known composition is available, a pseudo-critical temperature and pseudo-critical pressure which apply to the mixture can be obtained by using the averages of the critical temperatures and critical pressures of the pure gases in the mixture, weighted according to the molar percentage of each pure gas present.

Once a pseudo reduced temperature and a pseudo reduced pressure are known, the compressibility factor z can be found by use of standard charts. One of these is "Compressibility Factors for Natural Gases" by M. D. Standing and D. L. Katz, published in the Engineering Data Book, Gas Processors Suppliers Association, 10th edition, (Tulsa, Okla., U.S.A.) 1987. Alternatively, the compressibility can be calculated directly by equations of state using any suitable commercially-available computer program which are familiar to those skilled in the art.

In the temperature range of 70° F. to 300° F. (21.1° C. to 148.9° C.), methane has a reduced temperature above 1.5. Using charts or other methods to determine the compressibility factor, it can be determined that the compressibility of methane ranges from slightly above 0.8 to about 1.0. In this temperature range, the compressibility factor increases with increasing temperature. At these temperatures, methane has a minimum compressibility factor between about 2,000 and 2,500 psia (between 138 and 172 bar), depending upon temperature.

$CO_2$ and other acid gases have higher critical temperatures and pressures than methane. Gas streams with significant amounts of acid gases can have compressibilities that are lower than 0.8 at typical operating conditions for natural gas processing. Therefore, such gases can require significantly less power to compress than an equivalent volume of natural gas having a lower percentage of $CO_2$. The present invention takes advantage of this compressibility characteristic at pressures above about 1,200 psia (83 bar) and temperatures above about 120° F. (48.9° C.).

Dense Gas

In one embodiment of this invention, the gas feed stream comprising acid gas and methane is provided as a dense gas. The term "dense gas" is defined to mean that the gas has a compressibility factor less than about 0.8. The minimum pressure necessary for a gaseous mixture to achieve the dense state increases with increasing temperature and is composition dependent. As an example, without limiting the scope of the invention, for a gas feed stream containing 70% $CO_2$ and 30% methane at 80° F. (26.7° C.) the gas pressure would need to exceed about 730 psia (50.3 bar) to be in dense gas phase and the same composition at 50° C. (122° F.) would need to exceed about 1,700 psia (117 bar) to be in a dense state.

The compressibility factor of natural gas decreases as the concentration of $CO_2$ increases. For example, a gas mixture containing 30% methane and 70% $CO_2$ at a pressure of 2,900 psia (200 bar) and temperature of 80° F. (26.7° C.) has a compressibility factor of about 0.51. On the other hand, if the gas composition contains 70% methane and 30% $CO_2$, the compressibility factor is about 0.72 (all percentages being expressed in moles).

Membrane Permeation

Gas permeation through a membrane can be described as the overall mass transport of "penetrant gas" across the membrane where the penetrant gas is introduced at a higher pressure than the pressure on the permeate side of the membrane. Typically, in the separation process, the membrane being used exhibits a higher selectivity for one component, say component i than the other, say component j. Component i permeates faster than component j, therefore relative to the feed, the permeate is enriched in component i and the retentate is enriched in component j.

The equations will now be described for gas permeation through a defect free separation layer of a membrane having negligible mass transfer resistance in the porous support. The basic flux equation for a single component gas permeating through the separation layer is:

$$J_i = -B_i q_i (d\mu_i/dz) \quad (1)$$

wherein $J_i$ is the flux of gas species i, $B_i$ is the mobility of the gas species, $q_i$ is the fractional loading of the gas species on the surface of the membrane, $\mu_i$ is the chemical potential of the gas species, z is the distance across the membrane.

A commonly used engineering approximation of the flux equation for an ideal gas at a point along the membrane is expressed as:

$$F_i = \frac{P_i}{l} S(y_{if} p_f - y_{ip} p_p) \quad (2)$$

wherein:

$F_i$ is the flow rate of component i through the membrane

P is the permeability, expressed for example in $cm^3$ (STP).$cm/cm^2$.sec.cmHg, l is the width of the membrane, expressed for example in cm, S is the surface area of the membrane in $cm^2$, $y_{if}$ is the mole fraction of the desired component, on the feed side, $y_{ip}$ is the mole fraction of the desired component, on the permeate side, and $p_f$ and $p_p$ are respectively the pressure of the feed stream and the permeate.

This engineering approximation is rigorously correct in the Henry's law limit for ideal gasses and a membrane system in which there is not significant mass transfer resistance offered by the support or the hydrodynamic boundary layers present on the feed and permeate sides of the membrane. The terms within the parenthesis represent the difference in partial pressure for component i between the feed and permeate sides of the membrane. This difference is the assumed driving force for the separation.

Fugacity

For gas systems at high pressure, the assumption of ideal gas behavior to represent the driving force is inadequate. To be more thermodynamically rigorous, the partial pressures are corrected by "fugacity coefficients" that reflect deviations from ideal gas behavior. The equation for the fugacity of a component is given by:

$$f_i = y_i \phi_i p \quad (3)$$

wherein:
- $f_i$ is the fugacity of component i,
- $y_i$ is the mole fraction of component i,
- $\phi_i$ if the fugacity coefficient of component i, and
- p is the pressure.

For most real gases, the fugacity coefficient will be close to unity at low pressures. However, as the pressure is increased above a few hundred pounds per square inch, the fugacity coefficient of the components with lower reduced temperatures (generally the heavier components) can be as small as 0.2 or less. The fugacity coefficient of the "heavier" components typically increases with increasing temperature and decreasing pressure. The fugacity coefficients of the "lighter" components can show the opposite effect.

Fugacity coefficients can be experimentally determined by persons skilled in the art. Preferably, the fugacity coefficients are determined using an equation of state (EOS), such as the commercially available Soave-Redlich-Kwong EOS and the Peng-Robinson EOS.

By labeling $$\left(\frac{P}{l}\right)$$

as the effective permeance, $P_{\mathit{eff}}$, and correcting for non-ideal gases by adding fugacity coefficients, equation (2) can be rewritten as:

$$P_{\mathit{eff}} = F_i/S(y_{if}\Phi_{if}p_f - y_{ip}\Phi_{ip}p_p). \quad (4)$$

wherein:
- $P_{\mathit{eff},i}$ is the effective permeance of component i, expressed for example in cm$^3$ (STP)/cm$^2$.sec.cmHg,
- $F_i$ is the flow rate of the ith component exiting the process in permeate streams, expressed for example in cm$^3$ (STP)/sec,
- S is the surface area of the membrane expressed for example in cm$^2$,
- $p_f$ and $p_p$ are respectively the pressure of the feed stream and the permeate,
- $\Phi_{if}$ is the fugacity coefficient in the feed side for the desired component,
- $\Phi_{ip}$ is the fugacity coefficient in the permeate side for the desired component,
- $y_{if}$ is the mole fraction of component (i) entering on the feed side, and
- $y_{ip}$ is the mole fraction of component (i) exiting on the permeate side.

Recasting equation (4) in terms of flux (J=F/A) and fugacities yields, $$P_{\mathit{eff}} = \frac{J_i F}{f_{if} - f_{ip}} \quad (5)$$

An ideal effective permeance, using ideal gas based partial pressures, can be defined as $$P_{\mathit{eff}}^{ideal} = \frac{J_i}{y_{if}p_{if} - y_{ip}p_{ip}} \quad (6)$$

This ideal effective permeance is what is most commonly reported in the literature.

The effective permeance is typically reported in GPUs, which have the following units:

$$GPU[i] = 10^{-6} \times \frac{\mathrm{cm}^3(STP)}{\mathrm{cm}^2 \times \mathrm{sec.} \times \mathrm{cm.}Hg} \quad (7)$$

The effective permeance can be a function of the temperature, operating pressures on the feed and permeate sides, flow rates on the feed and permeate sides, as well as the feed and permeate compositions. Effective permeances at each point along the membrane can be predicted from a fundamental knowledge of the mass transfer resistance for each component passing through the separation layer, the support, and the hydrodynamic boundary layers adjacent to the separation layer and support. Effective permeances can also be measured through experimentation. In an experiment where the effective permeance is determined, the flux through the membrane of known area is measured under conditions where the partial pressure of the ith component is known on both the feed and permeate sides.

In a-membrane separation systems that remove $CO_2$ as permeate from a feed stream at high pressures, the $CO_2$ flow rate (F) increases with increasing fugacity for $CO_2$ in the feed stream and decreasing fugacity in the permeate stream. Since the fugacities of the gases in a membrane system can vary over a considerable range depending on pressure, temperature, and composition, the impact of fugacity on membrane flow rate can be estimated using equation (2) using the following steps:

1. Determine the $CO_2$ effective permeance assuming ideal gas behavior;
2. Determine the fugacity coefficient of $CO_2$ at feed and permeate conditions;
3. Calculate the ideal driving force (IDF) across the membrane:

$$IDF = y_{if}p_f - y_{ip}p_p;$$

4. Calculate the real driving force (RDF) taking into account fugacity ($\phi$):

$$RDF = y_{if}\phi_{if}p_f - y_{ip}\phi_{ip}p_p;$$

5. Adjust the $CO_2$ effective permeance by the ratio of RDF/IDF;

Model the membrane performance at each point of the membrane using the adjusted $CO_2$ effective permeance.

To have a high permeation rate of a given component, it is desirable to maintain a high fugacity of the component at the feed side of the membrane. For a membrane that permeates $CO_2$ preferentially to methane, this means maintaining a high $CO_2$ fugacity, preferably above 0.7. The fugacity coefficients for the acid gases mixed with lower molecular weight gases are typically less than 1. Tables 1 and 2 below show the fugacity values ($\phi$) for $CO_2$ as a function of temperature, pressure, and composition, assuming a binary mixture with methane. All composition percentages are mole percent.

TABLE 1

Fugacity Coefficients of $CO_2$ as a Function of Pressure and Composition

| Temperature °F. (°C.) | Pressure Psia (bar) | $\phi$ at 70% $CO_2$ | $\phi$ at 50% $CO_2$ | $\phi$ at 30% $CO_2$ | $\phi$ at 1% $CO_2$ |
|---|---|---|---|---|---|
| 60 (15.6) | 3,000 (207) | 0.27 | 0.31 | 0.36 | 0.46 |
|  | 2,000 (138) | 0.36 | 0.42 | 0.48 | 0.57 |
|  | 1,500 (103) | 0.47 | 0.53 | 0.58 | 0.65 |
|  | 1,000 (69) | 0.65 | 0.67 | 0.7 | 0.75 |
|  | 500 (34) | 0.82 | 0.83 | 0.84 | 0.87 |
| 120 (48.9) | 3,000 (207) | 0.43 | 0.47 | 0.51 | 0.59 |
|  | 2,000 (138) | 0.55 | 0.58 | 0.62 | 0.68 |
|  | 1,500 (103) | 0.65 | 0.67 | 0.70 | 0.75 |
|  | 1,000 (69) | 0.76 | 0.77 | 0.79 | 0.82 |
|  | 500 (34) | 0.88 | 0.88 | 0.89 | 0.92 |
| 180 (82.2) | 3,000 (207) | 0.57 | 0.59 | 0.63 | 0.69 |
|  | 2,000 (138) | 0.67 | 0.70 | 0.72 | 0.77 |
|  | 1,500 (103) | 0.75 | 0.76 | 0.78 | 0.81 |
|  | 1,000 (69) | 0.83 | 0.83 | 0.85 | 0.87 |
|  | 500 (34) | 0.91 | 0.91 | 0.92 | 0.93 |
| 240 (115.6) | 3,000 (207) | 0.67 | 0.69 | 0.72 | 0.77 |
|  | 2,000 (138) | 0.76 | 0.77 | 0.79 | 0.82 |
|  | 1,500 (103) | 0.81 | 0.82 | 0.84 | 0.86 |
|  | 1,000 (69) | 0.87 | 0.88 | 0.89 | 0.90 |
|  | 500 (34) | 0.93 | 0.94 | 0.94 | 0.95 |
| 300 (148.9) | 3,000 (207) | 0.75 | 0.76 | 0.78 | 0.82 |
|  | 2,000 (138) | 0.82 | 0.83 | 0.84 | 0.87 |
|  | 1,500 (103) | 0.86 | 0.87 | 0.88 | 0.90 |
|  | 1,000 (69) | 0.90 | 0.91 | 0.91 | 0.93 |
|  | 500 (34) | 0.95 | 0.95 | 0.96 | 0.96 |

TABLE 2

Fugacity Coefficients as a Function of Permeate Pressures

| Temperature °F. (°C.) | Pressure of Permeate Psia (bar) | $\phi$ at 95% $CO_2$ in Permeate |
|---|---|---|
| 60 (15.6) | 3,000 (207) | 0.33 |
|  | 2,000 (138) | 0.41 |
|  | 1,500 (103) | 0.57 |
|  | 1,000 (69) | 0.78 |
|  | 500 (34) | 0.89 |
| 120 (48.9) | 3,000 (207) | 0.52 |
|  | 2,000 (138) | 0.63 |
|  | 1,500 (103) | 0.75 |
|  | 1,000 (69) | 0.85 |
|  | 500 (34) | 0.92 |
| 180 (82.2) | 3,000 (207) | 0.66 |
|  | 2,000 (138) | 0.74 |
|  | 1,500 (103) | 0.82 |
|  | 1,000 (69) | 0.89 |
|  | 500 (34) | 0.94 |
| 240 (115.6) | 3,000 (207) | 0.75 |
|  | 2,000 (138) | 0.81 |
|  | 1,500 (103) | 0.87 |
|  | 1,000 (69) | 0.92 |
|  | 500 (34) | 0.96 |
| 300 (148.9) | 3,000 (207) | 0.81 |
|  | 2,000 (138) | 0.85 |
|  | 1,500 (103) | 0.90 |
|  | 1,000 (69) | 0.94 |
|  | 500 (34) | 0.97 |

The data in Tables 1 and 2 show that the fugacity coefficient of $CO_2$ increases with increasing temperature, decreasing pressure, and decreasing $CO_2$ composition.

Effective Permeance from Material Properties

The effective permeance can be estimated from the fundamental transport properties of a material by persons skilled in the art. For simplicity, it is assumed that the membrane has a mass transfer resistance of the support and the hydrodynamic boundary layers are small compared to that of the selective layer. Furthermore, it is assumed that the membrane materials have no significant mutual diffusion effects. The effective permeance can be determined by the competitive adsorption isotherm between the different components and the component diffusivities through the membrane layer.

In this example, the separation of two components i and j by a membrane is considered. Materials for which the competitive adsorption isotherm of species i with respect to species j can be approximately is described by a Langmuir form:

$$q_i = q_s\left(\frac{b_i f_i}{1 + b_i f_i + b_j f_j}\right) \qquad (8)$$

Wherein:

$q_i$ is the loading of the gas species i in the membrane, $q_s$ is the saturation loading in the separation layer of the membrane, $f_i$ is the fugacity of the gas species i, $f_j$ is the fugacity of the gas species j, $b_i$ is the parameter that determines the shape of the single component isotherm for component i, and $b_j$ is the parameter that determines the shape of the single component isotherm for component j.

To obtain an accurate prediction of the permeance, the values of $b_i$ and $b_j$ should ideally be obtained by fitting the single component isotherms for a particular material in the pressure range of interest, however in many cases, they can be obtained from a fit of the isotherm at lower pressures.

For this type of Langmuir isotherm, the flux of component A across a point along the separation layer is:

$$J_i = \frac{b_i q_s D_i^o}{l} \frac{1}{b_i + b_j/\gamma} \ln\left(\frac{1 + b_i f_{if} + b_j f_{jf}}{1 + b_j f_{jf} - \frac{b_j}{\gamma} f_{if} + b_i f_{ip} + \frac{b_j}{\gamma} f_{jp}}\right) \qquad (9)$$

Wherein:

$J_i$ is the flux of gas species i at a point P along the membrane, $f_{if}$ is the fugacity of the gas species i on the feed side at point P, $f_{ip}$ is the fugacity of the gas species i on the permeate side at point P, $f_{jf}$ is the fugacity of the gas species j on the feed side at point P, $f_{jp}$ is the fugacity of the gas species j on the permeate side at point P, $D_i^o$ is the diffusion coefficient of the gas species i, l is the thickness of the separation layer, and $$\gamma = \frac{f_{if} - f_{ip}}{f_{jf} - f_{jp}}$$

A similar flux equation can be written for component j, which can be readily derived by one skilled in the art. The effective permeance of component i at a point along the membrane can then be calculated from:

$$P_{\mathit{eff}} = \frac{J_i}{f_{if} - f_{ip}} \quad (10)$$

Selectivity

The ratio of the effective permeance for component i to that for component j is the effective selectivity ratio for i relative to j:

$$\text{Selectivity} = P_{\mathit{effi}} / P_{\mathit{effj}} \quad (11)$$

wherein:

$P_{\mathit{effi}}$ is the effective permeance of component i $P_{\mathit{effj}}$ is the effective permeance of component j Selectivity may be obtained directly by contacting a gas separation membrane, module or series of modules with a known mixture of gases entering at a pressure $p_f$, and analyzing the permeate flow rate and composition which exit at a pressure $p_p$. Alternatively, a first approximation of selectivity may be obtained by calculating the ratio of the rates of passage of the two components determined separately on the same gas separation membrane.

Drawings

One embodiment of the method of the invention will now be described with respect to FIG. 1. FIG. 1 is a simplified flow diagram of one embodiment of the invention. A vapor stream 10 may be supplied to the treatment process from chemical or refinery processes, from pressurized storage vessels, from associated gas produced from produced crude oil, from natural gas wells, from flue gas, from landfill gas, or from any other gaseous sources containing methane and at least one acid gas. Vapor stream 10 preferably enters the gas separation system at a pressure above 1,200 psia (82.8 bar), more preferably at a pressure above 1,500 psia (103 bar), and the feed stream 10 preferably enters the separation system at a temperature above 120° F. (48.9° C.) and more preferably above 150° F. (66° C.). If the feed pressure is below a preselected pressure for the feed side of the membrane, the pressure can be increased by passing stream 10 through one or more stages of compression (for simplicity, only one compressor 20 is shown in FIG. 1) to boost the pressure of the vapor stream to the preselected pressure. The feed gas is preferably temperature regulated to a predetermined level by a temperature regulator (not shown) and then fed into the feed side of the membrane module 40. If the feed temperature of the feed stream has a predetermined temperature, the feed stream need not be heated. However, if it does not meet the predetermined temperature, the feed can be heated by passing it through a suitable heating device 30, where the heating may be achieved by heat exchange with product streams and/or by any suitable external heating system that uses steam or other suitable heating medium.

The feed stream 10, at a preselected temperature and pressure, is ten passed to one or more membrane modules 40. Retentate 11 exiting the membrane system may, if further pressurization is desired, be passed to one or more compressors 21 to further pressurize the methane enriched retentate stream for further treatment or use as a sales gas product. If desired, the feed to compressors 21 can be cooled by any suitable cooling means 31 to reduce compression power requirements. Permeate stream 13 enriched in $CO_2$ is passed to one or more stages of compression (only one compressor 22 is shown in FIG. 1) to further pressurize the permeate stream. The pressure of permeate stream 13 is preferably at least 20% of the pressure of the feed stream to the feed side of the membrane module 40, and more preferably exceeds 30% of the feed pressure. The permeate may be cooled in cooler 32 to reduce compression power requirements. The compressed permeate may be passed through an aftercooler 33 to cool the permeate stream prior to subsequent use. Aftercooler 33 may be any conventional cooling system that cools the permeate. The carbon dioxide-enriched permeate is available for any desired use. For example, the permeate enriched in $CO_2$ can be injected into a subterranean formation (not shown) for pressure maintenance purposes or injected into oil-bearing formations to enhance oil recovery by techniques that are well known. The pressurized permeate can also be used as a supercritical fluid solvent in oil recovery operations.

The pressure of the permeate leaving the membrane system 40 is preferably maintained as high as practical to reduce the temperature drop in the module and to reduce the power required to compress the permeate to a higher pressure. The optimum differential pressure across the membrane(s) depends upon the particular feed stream composition, the feed stream component(s) to be separated, the type of membrane(s) used, the desired composition of the retentate or permeate, as well as other factors known to those skilled in the art.

FIG. 2 schematically illustrates another embodiment of the invention similar to the embodiment illustrated in FIG. 1, except that the membrane separation is shown in three membrane stages 40, 41, and 42. The retentate stream is further depleted in acid gas at each successive membrane stage. As the retentate temperatures generally will decrease with each subsequent stage, heaters 36 and 37 are preferably used to keep the feed temperatures to subsequent membrane units above a predetermined desired temperature for each stage. Permeate stream 15 from the last membrane stage 42 is potentially cooled in aftercooler 38, pressurized by compressor 24 and cooled by aftercooler 35. Compressed permeate stream 15 is then combined with permeate stream 16 from membrane stage 41 and the combined stream may optionally be cooled in aftercooler 39, passed through compressor 23, and cooled by aftercooler 34. The aftercoolers 34 and 35 can optionally provide some or all of the heat load required for heaters 36 and 37 respectively. This is represented by the dotted lines 18 and 19 connecting the heaters and coolers. The combined permeate streams 15 and 16 are then combined with permeate stream 13 and the combined streams are cooled by cooler 32, compressed by compressor 22, and aftercooled by cooler 33 to produce an acid-gas product stream 14 to be used in any suitable manner. The addition of additional stages can, as recognized by those skilled the art, reduce the recompression requirements of the overall permeate stream.

FIG. 3 schematically illustrates another embodiment of the invention similar to the embodiment illustrated in FIG. 2, except that all or part of the outlet streams from compressors 23 and 24 are withdrawn as streams 27 and 28 to provide heat to the gases in membrane modules 40 and 41. The heat available from streams 27 and 28 can increase the driving force for separation in the membrane modules 40 and 41 by increasing the temperature within the modules. This heat can be supplied either through indirect heat exchange (not shown) within membrane modules 40 and 41 or by using streams 27 and 28 directly as a permeate sweep. If used as a sweep, streams 27 and 28 will exit as parts of streams 16 and 13 respectively. As recognized by those skilled in the art, the use of a sweep gas in a membrane module can increase the efficiency of separation by reducing the partial pressure of at least some of the permeating components and by decreasing the mass transfer resistance between the support and the bulk permeate flow.

Additional Treatment

Referring to FIG. 1, due to the physical construction and operating characteristics of membrane module 40, feed stream 10 should be evaluated for the presence of particulates, entrained liquids, crude oil, water, chemicals, and condensable hydrocarbons. The scope of the invention includes any treatment steps carried out upstream or downstream of the acid gas separation process to remove other gas components. For example, it may be advantageous to remove other contaminants upstream of the membrane separation module.

The membranes themselves may be capable of handling water, hydrocarbons, and these components may be concentrated in either the retentate or permeate streams. If these substances are present in amounts that could interfere with membrane treatment operations, one or more devices to remove these substances (not shown in the drawings) is preferably placed upstream of the membrane module 40, and in the case of a gas stream rich in heavy hydrocarbons, a heavy carbon removal system may be desirable. Even though the membrane systems may be able to dehydrate the gas stream while removing $CO_2$, liquid water preferably does not enter membrane module 40.

It will be apparent to those skilled in the art that numerous embodiments of the invention carrying out additional separation steps in diverse ways are possible. For example, these include, but are not limited to (1) a dehydration step followed by an methane/acid gas membrane separation step, (2) a natural gas liquid (NGL) removal step followed by the methane/acid gas membrane separation step, (3) a dehydration step and a NGL removal step followed by the methane/acid gas membrane separation step, (4) the methane/acid gas membrane separation step followed by a dehydration step, (5) the methane/acid gas membrane separation step followed by NGL removal step on the permeate stream, (6) the methane/acid gas membrane separation step followed by a dehydration step on the permeate stream, and (7) a dehydration step and a NGL removal step followed by the methane/acid gas membrane separation step, followed by a second dehydration step and a NGL removal step on the permeate stream.

Process Configuration

The present invention is not limited to the membrane configuration shown in the drawings. The membrane separation process may contain a single membrane module as illustrated in FIG. 1, or multiple membrane modules as illustrated in FIGS. 2–3, or an array of modules. A single-stage membrane separation operation depicted in FIG. 1 may be adequate for many applications. If the retentate stream 12 requires further purification, it may be passed to additional banks of membrane modules as shown in FIG. 2 for further processing. If the permeate stream 14 requires further concentration, it may be passed to one or more additional membrane modules (not shown) for additional treatment. For example, a two-stage (or more complicated) membrane configuration, in which the permeate from the first stage becomes the feed for the second, may be used to further enrich the $CO_2$ content of the permeate stream and to reduce methane losses. It is envisaged that a two-stage membrane configuration, using like or unlike membrane types in the two stages can be used. In such arrangements, the retentate stream from the second stage may be recirculated for further treatment in the first stage, or may be passed to gas pipeline, for example. Such multi-stage or multi-step processes, and variants thereof, will be familiar to those of skill in the art, who will appreciate that the membrane separation process may be configured in many possible ways, including single-stage, multi-stage, multi-step, or more complicated arrays or two or more units in serial or cascade arrangements.

Membrane Module Design

The membrane module containing the membrane may be of any suitable design for gas separations, such as a plate and frame type, spiral wound membranes, tubular membranes, hollow fiber membranes, or the like. The membrane is typically composed of a separation layer and a support. The separation layer is typically formed on the surface of the support. The support is designed to provide mechanical support to the separation layer while offering as little mass transfer resistance as possible. The flux through the membrane is affected by the thickness of the separation material and the support. In general it is desirable to have the separation layer, through which a permeating component must pass, as thin as possible yet sufficiently thick that the flow through the layer is not dominated by defects. The support must be thick enough to provide adequate strength to the separation layer to withstand the separation conditions. Suitable composite membranes may comprise a thin separation layer formed on the surface of a thicker porous physical support that provides the necessary physical strength to the membrane.

The gas separation membranes are preferably in the form that maximize the surface area in the most economically sized apparatus. The membranes can likewise be either symmetric or asymmetric, isotropic (having substantially the same density throughout) or anisotropic (having at least one zone of greater density than at least one other zone), and can be chemically homogenous (constructed of the same material) or it may be a composite membrane.

The membrane used in the method of the invention preferably has high selectivity for one or more acid gases at a sufficiently high effective permeation rate of the permeate gas per unit surface area. Separation membranes that exhibit a high flux but low selectivity separation are unattractive as they require large separating membrane surface areas. Similarly, separation membranes that exhibit adequately high selective separation but undesirably low fluxes are also lacking in practical use feasibility. It would be highly desirable to obtain membranes having high effective permeances as well as high selectivity. However, frequently there is an inverse relationship between the permeation rate of the component (flow) and the selectivity of the membrane to the desired component relative to other components of the gaseous mixture. Membranes used in the process of this invention preferably have a selectivity ratio of the acid gas to methane (or other light gas) greater than about 10 and more preferably greater than 50, although membranes with selectivity ratios lower than 10 can be used.

Preferably the effective permeance values for the acid gas components for membranes useful in the practice of the invention are at least 100 GPU, with at least 800 GPU being more preferred.

Membrane Separation Layer Materials

Any suitable material may be used for the separation layer as long as it is stable for the given composition at temperatures above about 120° F. (48.9° C.) and pressures above about 1,200 psia (82.8 bar) and have adequate effective permeance and selectivity at those conditions. Most membranes in service for acid gas separation are made from polymers, and most of these polymers either lack stability at the operating conditions of the present invention or do not provide adequate values of permeance or selectivity. Most of such polymeric membranes have been designed or selected to operate most effectively at temperatures below about 100° F. (37.8° C.).

While certain polymers or glassy materials could give adequate performance at the higher temperature and pressure conditions of the present invention, it is preferred that the separation layer used in the practice of the present invention be inorganic. The inorganic layer, formed from, for example, zeolites, microporous silica, or microporous carbon, is preferably placed on a structured support. The performance characteristics of such inorganic membranes at a given temperature can be enhanced by persons skilled in the art by modifying the surface, changing the pore size, and/or altering the composition of the membrane.

The invention is not intended to be limited to any particular membrane material or membrane type, however, and encompasses any membrane, of any material, that is capable of giving adequate values for permeance and selectivity. This includes, for example, homogeneous membranes, composite membranes, and membranes incorporating sorbents, carriers, or plasticizers.

Support Materials

The support should offer minimal mass transfer resistance with strength sufficient to withstand the stress created by relatively large pressure differentials across the membrane. For asymmetric membranes, the support is porous.

Typically for asymmetric polymer membranes, the porous support is manufactured from the same polymer as the active separation layer. In some polymer membrane manufacturing processes, the porous support material is formed simultaneously with active separation layer. Depending on the module format, the support can be a hollow fiber, monolith, or a flat sheet. In all cases the support material must be incorporated into a module. An important step in incorporating the support into the module is sealing the support (or support plus separation layer) so that the hydrodynamic flow along the permeate and feed sides are physically separated. The seals and support are designed to withstand pressure differentials between the feed and permeate sides.

For asymmetric inorganic membranes, the porous support can be made from a different material than the active separation layer. Support materials for asymmetric inorganic membranes include porous aluminas, silicon carbides, porous metals, cordierites, and carbons. Depending on module format, these porous support materials may be formed as flat sheets, tubes, hollow fibers, and monoliths.

It is also possible to form an asymmetric hybrid membrane structure in which a polymeric active separation layer is coated onto a porous inorganic support.

Separation Temperature and Pressure

The temperature at which the acid gas separation is conducted should be such that the driving force for the acid gas across the membrane is sufficient for an effective separation. If the waste gas is desired at high pressure, then the driving force requirements become more important, since increasing the permeate pressure reduces the driving force available across the membrane. At feed pressures above 1,200 psia (82.8 bar), and a permeate pressure at least 20% of the feed pressure, this corresponds to temperatures above about 120° F. (48.9° C.). Temperatures in the range from about 120° F. (48.9° C.) to about 300° F. (148.9° C.) are typically operable, dependent on a variety of factors. The optimum operating temperature depends upon the feed composition, the membrane material, the pressure, ambient temperature, and the availability of heating and cooling utilities. The optimum temperature range can be determined through modeling or empirically by persons skilled in the art based on the teachings contained herein.

EXAMPLE 1

To demonstrate the benefit of feed compression if the feed is available as a dense gas, a process simulation was performed using a software tool designed to simulate the treatment of a 1 billion standard cubic feet per day (1 BSCFD) (28 million SCMD) of a gas stream containing 70% $CO_2$ and 30% methane at a temperature of 80° F. (26.7° C.) to produce a sales gas stream with 20% $CO_2$ at 2,400 psia (165.5 bar) and a disposal stream with 96% $CO_2$ at 1920 psia (132.4 bar). The treatment process was assumed to be carried out according to the process design shown in FIG. 1 with the pressure of the permeate stream 13 being 20% of the pressure of feed stream 10 and two stages of compression (only one stage is shown in FIG. 1) each with a pressure ratio of 2. The calculations further assumed that the $CO_2$ permeate streams were cooled to 80° F. (26.7° C.) before compression, and that the compressors/pumps operated with 75% efficiency. The membranes used in this simulation had selectivities of about 50 (calculated on an ideal gas basis) at all points along their length. The membrane was modeled in a countercurrent flow configuration. Minor pressure drops across heat exchangers and through the membrane modules were ignored in the calculations. In addition, any effects of the temperature on the performance of the membrane or on the driving force across the membrane were ignored. The following three cases were compared:

Case 1: Starting with a feed pressure of 1,200 psia (82.8 bar), with no additional compression of the feed stream.

Case 2: Starting with a feed pressure of 1,200 psia (82.8 bar) and boosting the feed pressure to 2,400 psia (165.5 bar) before entering the membrane system.

Case 3.: Starting with a feed pressure of 2,400 psia (165.5 bar) (no boosting of the feed pressure).

The results of the calculations are shown in Table 3. The total compression power represents the power required to boost the pressure of the feed stream (Case 2 only) and the power required to pressurized the retentate to 2,400 psia (165.5 bar) and the power required to produce a permeate stream 14 of 1,920 psia (132.2 bar).

TABLE 3

| Case No. | Feed Pressure Psia (Bar) | Feed Compression MW | $CO_2$ Compression MW | Sales Gas Compression MW | Total Compression MW |
|---|---|---|---|---|---|
| 1 | 1,200 (82.8) | — | 53 | 10 | 63 |
| 2 | 1,200 (82.8) | 23 | 31 | — | 54 |
| 3 | 2,400 (165.5) | — | 31 | — | 31 |

As can be seen from Table 3, operating with a higher feed pressure saves total power even if feed compression is required. The benefit from Case 2 relative to Case 1 was primarily a result of the compressibility (0.63) of the feed stream 10 being significantly less than the compressibility (0.83) of the inlet to the sales gas compressor 21.

If the temperature of the feed for Case 2 was raised to 151° F. (66° C.) to give a compressibility of 0.80, the total compression power required was the same as for Case 1.

If the $CO_2$ content in the feed was lowered to 25%, and the feed temperature was lowered to 66° F. (19° C.) to achieve a compressibility of 0.8, the total compression calculated for the analogous Cases 1 and 2 was the same.

EXAMPLE 2

The calculations of Example 1 were repeated, using the same assumptions made in Example 1, except that $CO_2$ was replaced by nitrogen. This had the effect of raising the compressibility factors in all streams and hence the compression required for each inlet stream to a compressor. The results are shown in Table 4.

TABLE 4

| Case No. | Feed Pressure Bar | Feed Compression MW | $N_2$ Compression MW | Sales Gas Compression MW | Total Compression MW |
|---|---|---|---|---|---|
| 4 | 82.8 | — | 71 | 11 | 82 |
| 5 | 165.5 | 35 | 47 | — | 82 |
| 6 | 165.5 | — | 48 | — | 48 |

As can be seen from Table 4, there is no advantage in boosting the feed before the membrane separation step (Cases 4 and 5).

EXAMPLE 3

The calculations of Example 1 were repeated, using the same assumptions made in Example 1, except that the initial feed gas pressures were varied over a wider range. Cases were also run for a one stage, two stage, and three stage systems. For the two stage system, the pressure of the first stage was chosen as 40% of the feed pressure and it was assumed that half the total permeate stream exited at that pressure. For the three stage system, the pressure of the second stage was chosen as 30% of the feed pressure with half of the permeate exiting the first stage and 25% at each subsequent stage. The results of these calculations are shown in Table 5.

TABLE 5

| Case No. | Feed Pressure Psi (Bar) | One Stage Membrane: Total Compression Power MW | Two Stage Membrane: Total Compression Power MW | Three Stage Membrane: Total Compression Power MW |
|---|---|---|---|---|
| 7 | 150 (10.3) | 164 | 147 | 141 |
| 8 | 300 (20.7) | 130 | 113 | 107 |
| 9 | 600 (41.4) | 95 | 80 | 74 |
| 10 | 1200 (82.8) | 63 | 47 | 43 |
| 11 | 2400 (165.5) | 31 | 17 | 13 |

As can be seen from Table 5, operating with a higher feed pressure can save significant amounts of compression power. The table also shows that staging can reduce compression power.

EXAMPLE 4

Starting with the assumptions in Example 3, a computer simulation was also made to examine the impact of temperature on membrane performance focusing solely on the impact of thermodynamic driving force across the membrane. In other words, the permeance characteristics of the membrane material itself were assumed constant under all conditions. This assumption may be reasonable for materials that rely primarily on size exclusion (as opposed to competitive adsorption or solution) for the separation.

The calculations assumed an effective $CO_2$ permeance of 800 GPU under ideal gas conditions and an effective methane permeance of 16 GPU. The effective selectivity of the membrane under ideal gas conditions was assumed to be 50. The permeate composition was allowed to vary with the change in driving force. The simulation steps were:

1. Assume a value of the CO2 permeance under ideal gas behavior;
2. Determine the fugacity coefficient of $CO_2$ at feed and permeate conditions;
3. Calculate the ideal driving force (IDF) across the membrane:

$$IDF = y_{if} p_f - y_{ip} p_p;$$

4. Calculate the real driving force (RDF) taking into account fugacity ($\phi$):

$$RDF = y_{if} \phi_{if} p_f - y_{ip} \phi_{ip} p_p; \text{ and}$$

5. Adjust the $CO_2$ permeance by the ratio of RDF/IDF.

The membrane performance was then modeled at each point of the membrane using the adjusted CO2 permeance. In addition, the membrane calculation was split into two stages (with identical permeate pressures) so that the permeate from the second stage was recycled to the feed. The amount of recycle flow was set so that the same hydrocarbon recovery was met in all cases. The added recycle resulted in the increased requirements for compression power for the non-ideal cases. The results are summarized in Table 6.

TABLE 6

| Case | Feed Pressure psia (bar) | Temperature ° F. (° C.) | Feed CO2 Fugacity Coefficient | Compression Power MW | Membrane Area ft² (m²) X 1000 |
|---|---|---|---|---|---|
| 12 | 150 (10.3) | Ideal | 1.00 | 164 | 1300 (120) |
| 13 |  | 80 (26.7) | 0.94 | 167 | 1400 (120) |
| 14 |  | 120 (48.9) | 0.95 | 166 | 1300 (120) |
| 14 |  | 240 (115.6) | 0.97 | 165 | 1300 (120) |
| 16 | 300 (20.7) | Ideal | 1 | 130 | 640 (60) |
| 17 |  | 80 (26.7) | 0.90 | 134 | 740 (69) |
| 18 |  | 120 (48.9) | 0.92 | 133 | 700 (65) |
| 19 |  | 240 (115.6) | 0.96 | 132 | 660 (61) |
| 20 | 600 (41.4) | Ideal | 1 | 95 | 320 (30) |
| 21 |  | 80 (26.7) | 0.80 | 107 | 440 (41) |
| 22 |  | 120 (48.9) | 0.84 | 104 | 400 (37) |
| 23 |  | 240 (115.6) | 0.92 | 98 | 350 (33) |
| 24 | 1200 (82.8) | Ideal | 1 | 63 | 160 (15) |
| 25 |  | 80 (26.7) | 0.63 | 89 | 310 (29) |
| 26 |  | 120 (48.9) | 0.70 | 82 | 270 (25) |
| 27 |  | 240 (115.6) | 0.84 | 72 | 200 (19) |
| 28 | 2400 (165.5) | Ideal | 1 | 31 | 80 (7) |
| 29 |  | 80 (26.7) | 0.38 | 84 | 330 (31) |
| 30 |  | 120 (48.9) | 0.48 | 60 | 220 (20) |
| 31 |  | 240 (115.6) | 0.72 | 40 | 120 (11) |

From Table 6, it can be observed that higher temperatures are required to capture the benefits of operating at higher pressure. In particular, at 80° F. (26.7° C.) note that the power and area required are comparable for the 2,400 psi (165.5 bar) and 1,200 psi (82.8 bar) cases (Cases 29 and 25). As such, no real benefit is seen in operating at pressures above 1,200 psi (82.8 bar). At 120° F. (48.9° C.) some benefit is seen as the comparable pressures are increased (Cases 26 and 30). One can see that maintaining the temperature such that the $CO_2$ fugacity coefficient is greater than or equal to about 0.7 (Cases 26 and 31), that most of the large potential advantages of higher pressure operation are conserved.

The foregoing process power requirements for specific process designs using specific gas compositions, pressures, and temperatures were performed using a commercially available process simulator. Persons skilled in the art will be able to perform similar calculations for streams of other compositions and flow rates based on the present teachings.

EXAMPLE 5

Starting with the assumptions in Example 4, a computer simulation was also made to examine the impact of pressure and temperature on membrane performance which also accounts for the impact of the membrane material properties using equations (9) and (10). A material, microporous silica, was chosen to represent a material that includes both size exclusion and competitive adsorption for the separation.

The calculations assumed, as reference, an effective $CO_2$ permeance of 800 GPU under ideal gas conditions and an effective methane permeance of 16 GPU as stated in Example 4.

The membrane performance was modeled using the transport parameters for silica derived from the Ph.D. thesis of Renate de Vos (University of Twente, 1998) entitled "High-Selectivity, High-Flux Silica Membranes for Gas Separation". The fluxes and effective permeances were calculated assuming that the Langmuir model (equations (9) and (10)) was valid at each point along the module. The specific parameters for the transport come from the low pressure permeation data for the preparation called "Si(400)" in the de Vos reference. The calculation assumptions were as follows:

The feed compositions, pressures, temperatures, and fugacity coefficients from Example 4, The Langmuir parameters (b) for $CO_2$ and $CH_4$ in equation (9) for the microporous silica membrane Si(400) were estimated from the data in the thesis to be (units $bar^{-1}$:):

b for $CO_2$: $b=2.56 \times 10^{-5} e^{24/RT}$.

b for $CH_4$: $b=2.01 \times 10^{-5} e^{20/RT}$.

where R is the gas constant in kilo-joules/mole-° K. (0.008314) and T is in ° K.

The diffusion coefficients (D) for $CO_2$ and $CH_4$ in equation (9) for the microporous silica membrane Si(400) were estimated from the data in the thesis to be (units $cm^2/sec$):

D for $CO_2$: $D=1.12 \times 10^{-4} e^{-22/RT}$

D for $CH_4$: $D=5.96 \times 10^{-5} e^{-30/RT}$

The saturation concentration ($q_s$) for $CO_2$ in silica is 3.0 mmol/gm and the density of the microporous silica is 1.8 $gm/cm^3$. The saturation concentration ($q_s$) for $CH_4$ (2.0 mmol/gm) in silica is scaled from the value for $CO_2$ and the molecular size parameters given by de Vos.

The resulting calculations of membrane performance had average selectivities always greater than 50, the assumed reference value. As such, no additional recycle compression was required to meet the target permeate concentration from Example 4. The results are summarized in Table 7.

TABLE 7

| Case | Feed Pressure psia (bar) | Temperature ° F. (° C.) | Feed CO2 Fugacity Coefficient | Compression Power MW | Membrane Area ft² (m²) X 1000 |
|---|---|---|---|---|---|
| 32 | 150 (10.3) | Ideal | 1.00 | 164 | 1300 (120) |
| 33 | | 80 (26.7) | 0.94 | 164 | 2900 (270) |
| 34 | | 120 (48.9) | 0.95 | 164 | 2200 (200) |
| 35 | | 240 (115.6) | 0.97 | 164 | 1500 (140) |
| 36 | 300 (20.7) | Ideal | 1 | 130 | 640 (60) |
| 37 | | 80 (26.7) | 0.90 | 130 | 2300 (210) |
| 38 | | 120 (48.9) | 0.92 | 130 | 1600 (150) |
| 39 | | 240 (115.6) | 0.96 | 130 | 900 (80) |
| 40 | 600 (41.4) | Ideal | 1 | 95 | 320 (30) |
| 41 | | 80 (26.7) | 0.80 | 95 | 2300 (210) |
| 42 | | 120 (48.9) | 0.84 | 95 | 1400 (130) |
| 43 | | 240 (115.6) | 0.92 | 95 | 580 (54) |
| 44 | 1200 (82.8) | Ideal | 1 | 63 | 160 (15) |
| 45 | | 80 (26.7) | 0.63 | 63 | 2700 (250) |
| 46 | | 120 (48.9) | 0.70 | 63 | 1400 (130) |
| 47 | | 240 (115.6) | 0.84 | 63 | 450 (42) |
| 48 | 2400 (165.5) | Ideal | 1 | 31 | 80 (7) |
| 49 | | 80 (26.7) | 0.38 | 31 | 5100 (470) |
| 50 | | 120 (48.9) | 0.48 | 31 | 2000 (180) |
| 51 | | 240 (115.6) | 0.72 | 31 | 410 (38) |

For this example, while the power benefits of high pressure operation were conserved in all cases, the required membrane areas varied a great deal. To estimate the economic impact of the power versus membrane area required, it was assumed that the installed cost of power was U.S. $1 million/MW and that the installed cost of membrane area was U.S. $50/ft². Also shown are the calculated selectivities at each condition. No incremental credit was taken for the higher selectivities in the cost analysis. The resulting installed costs are shown in Table 8.

TABLE 8

| Case | Feed Pressure psia (bar) | Temperature ° F. (° C.) | Feed CO2 Fugacity Coefficient | CO2/methane Selectivity | Total Cost in $M |
|---|---|---|---|---|---|
| 32 | 150 (10.3) | Ideal | 1.00 | 50 (assumed) | 230 |
| 33 | | 80 (26.7) | 0.94 | 410 | 310 |
| 34 | | 120 (48.9) | 0.95 | 300 | 270 |
| 35 | | 240 (115.6) | 0.97 | 140 | 240 |
| 36 | 300 (20.7) | Ideal | 1 | | 160 |
| 37 | | 80 (26.7) | 0.90 | 390 | 250 |
| 38 | | 120 (48.9) | 0.92 | 290 | 210 |
| 39 | | 240 (115.6) | 0.96 | 140 | 170 |
| 40 | 600 (41.4) | Ideal | 1 | | 110 |
| 41 | | 80 (26.7) | 0.80 | 330 | 210 |
| 42 | | 120 (48.9) | 0.84 | 250 | 160 |
| 43 | | 240 (115.6) | 0.92 | 130 | 120 |
| 44 | 1200 (82.8) | Ideal | 1 | | 70 |
| 45 | | 80 (26.7) | 0.63 | 230 | 200 |
| 46 | | 120 (48.9) | 0.70 | 190 | 130 |
| 47 | | 240 (115.6) | 0.84 | 120 | 90 |
| 48 | 2400 (165.5) | Ideal | 1 | | 40 |
| 49 | | 80 (26.7) | 0.38 | 80 | 290 |
| 50 | | 120 (48.9) | 0.48 | 100 | 130 |
| 51 | | 240 (115.6) | 0.72 | 90 | 50 |

Using these assumptions, the table shows no benefit in operating at pressures above 1,200 psia (82.8 bar) unless the temperature is at least 120° F. (48.9° C.). In addition, again note that most of the benefit of operating at the higher pressure is captured if the feed fugacity coefficient of $CO_2$ is at least 0.70.

The data of Example 5 show that in the practice of the present invention variations in transport properties produce variations in performance properties and allow for the possibility of tuning the membrane performance to the requirements of the present invention, including the specific requirements of multi-stage separation processes disclosed herein.

A person skilled in the art, particularly one having the benefit of the teachings of this patent, will recognize many modifications and variations to the specific embodiments disclosed above. For example, a variety of temperatures and pressures may be used in accordance with the invention, depending on the overall design of the system, the membrane system selected, the desired component separations, and the composition of the feed gas. Additionally, certain process steps may be accomplished by adding devices that are interchangeable with the devices shown. As discussed above, the specifically disclosed embodiment and examples should not be used to limit or restrict the scope of the invention, which is to be determined by the claims below and their equivalents.

We claim:

1. A method of separating one or more components from a multi-component gas stream comprising at least one non-acid gas component and at least one acid gas component, the method comprising:

(a) providing a multi-component gas stream at a pressure above 1,200 psia (82.8 bar) and a temperature above 120° F. (48.9° C.) with the concentration of at least one acid gas component in the gas stream being at least 20 mole percent; and (b) passing said multi-component gas stream to a membrane system that selectively separates at least one acid gas component from the multi-component gas stream as a permeate stream, said permeate stream having a pressure at least 20% of the pressure of the feed pressure.

2. The method of claim 1 wherein the concentration of the acid gas in the permeate is at least 80 mole percent.

3. The method of claim 1 wherein the acid gas comprises at least one of carbon dioxide, hydrogen sulfide, and carbonyl sulfide.

4. The method of claim 1 wherein the membrane separation comprises multiple separation stages.

5. The method of claim 1 wherein the at least one acid gas component is $CO_2$ and the concentration of the $CO_2$ gas in the permeate is at least 60 mole percent.

6. The method of claim 1 wherein the fugacity coefficient of the at least one acid gas component is at least 0.7 in the feed stream.

7. The method of claim 1 wherein the pressure of the multi-component gas stream is above 1,500 psia (103 bar).

8. The method of claim 1 wherein the temperature of the multi-component gas stream is above 150° F. (66° C.).

9. A method of separating one or more components from a multi-component gas stream comprising at least one non-acid gas component and at least one acid gas component, the method comprising:

(a) pressurizing the multi-component gas containing an acid gas composition greater than 20 mole percent and which has a compressibility factor less than 0.8 to create a second stream at a higher pressure;

(b) separating the second stream in one or more separation stages into at least two streams, a third stream depleted in at least one acid gas component compared to the second stream and a fourth stream enriched in at least one acid gas component compared to the second stream; the pressure of the third stream being at a pressure greater than the pressure of the initial multi-component gas stream; the pressure of the fourth stream being at a pressure which is less than that of the initial multi-component gas stream; and (c) pressurizing the fourth stream to a pressure that is higher than that of the initial multi-component gas stream.

10. The method of claim 9 wherein the multi-component gas is natural gas and the at least one non-acid gas component is methane and the at least one acid gas component is carbon dioxide.

11. The method of claim 10 wherein the carbon dioxide concentration in the multi-component gas is at least 30 mole percent.

12. The method of claim 11 wherein the carbon dioxide concentration in the multi-component gas exceeds 50 mole percent.

13. The method of claim 9 wherein the multi-component gas is pressurized to a pressure above 1,200 psia (82.8 bar) in step (a).

14. The method of claim 9 wherein separation is carried out by a membrane.

15. The method of claim 9 further comprises the step of pressuring the first stream to a pressure above 1,500 psia (103 bar).

16. The method of claim 9 wherein the temperature of the multi-component gas stream is above 150° F. (66° C.).

17. The method of claim 9 further comprises the step of passing the pressurized fourth stream into a subterranean formation.

18. A method of separating one or more components from a multi-component gas stream comprising a non-acid gas component and an acid gas component, the method comprising:

(a) providing the multi-component gas stream at a pressure below 1,200 psai (82.8 bar) or at a temperature below 80° F. (26.7° C.), the concentration of the acid gas component being at least 20 mole percent;

(b) increasing the fugacity of the acid gas component in the feed stream by at least one of the acts of increasing the temperature of the feed stream to above 80° F. (26.7° C.) or increasing the pressure of the feed stream to above 82.8 bar such that the stream has a temperature above 80° F. (26.7° C.) and a pressure above 82.8 bar; and (c) passing the multi-component gas stream to a membrane system that selectively separates the acid gas component from the multi-component gas stream as permeate stream, said permeate stream having a pressure at least 20% of the pressure of the feed pressure.

19. The method of claim 18 wherein the act of increasing the fugacity of the acid gas component includes direct or indirect heat exchange.

20. The method of claim 18 wherein the act of increasing the fugacity of the acid gas component includes compression.

* * * * *